Figure 1:
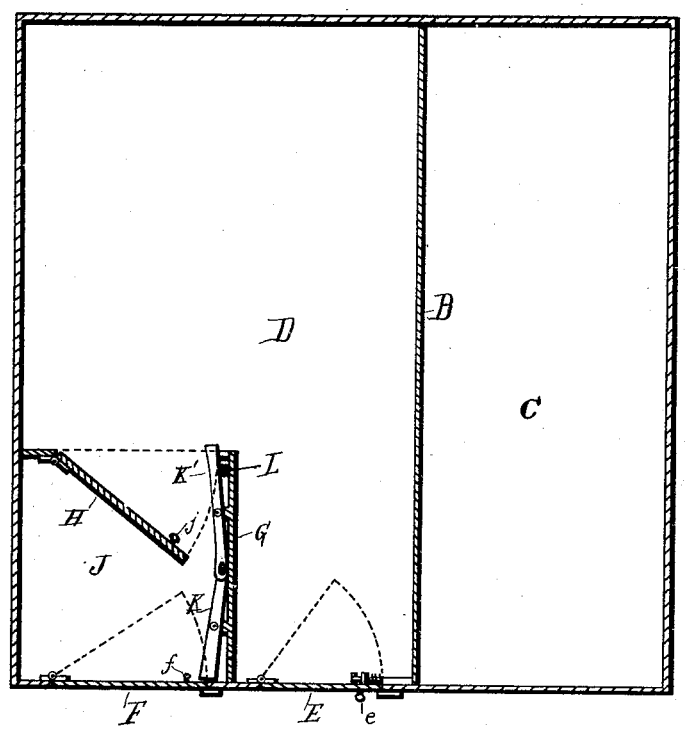

(No Model.) 4 Sheets—Sheet 1.

J. H. MYERS.
VOTING MACHINE.

No. 415,549. Patented Nov. 19, 1889.

Witnesses.
A. H. Labasse.
Fred F. Church.

Inventor.
Jacob H. Myers
By Church Church
Attorneys.

(No Model.) 4 Sheets—Sheet 2.
J. H. MYERS.
VOTING MACHINE.
No. 415,549. Patented Nov. 19, 1889.
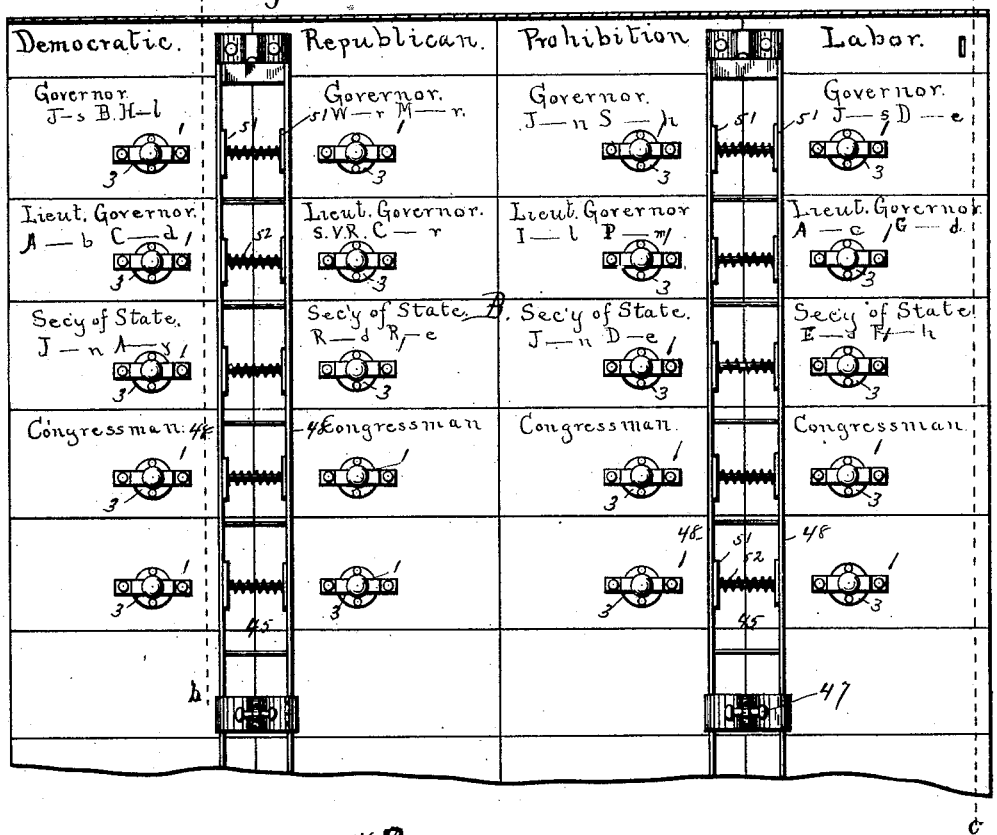
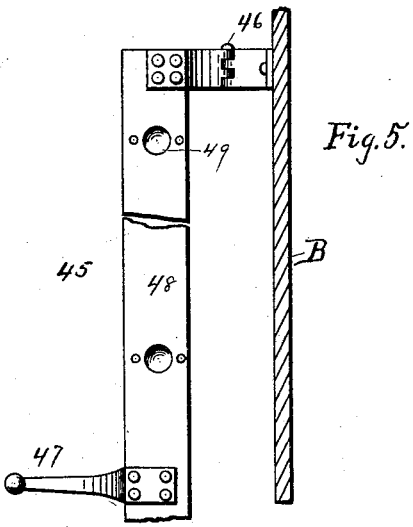
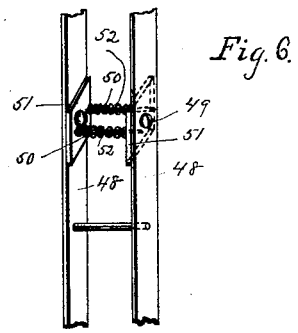
Witnesses:-
Inventor:
Jacob H. Myers
By Church & Church
Attorneys.

(No Model.)  4 Sheets—Sheet 3.
J. H. MYERS.
VOTING MACHINE.
No. 415,549. Patented Nov. 19, 1889.
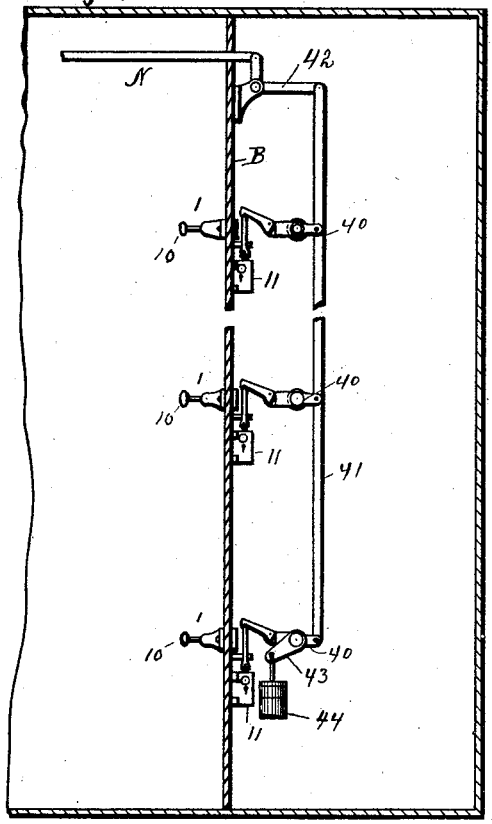
Fig. 7.
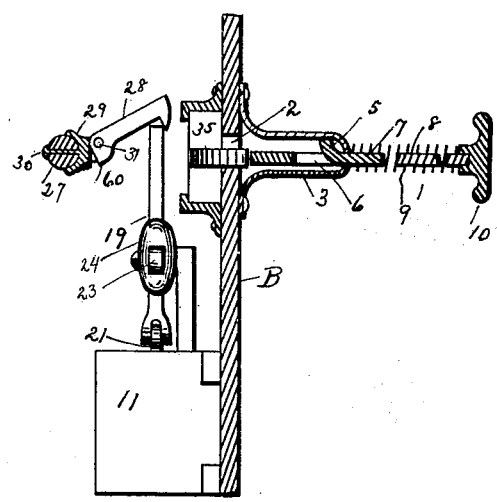
Fig. 9.
Fig. 8.
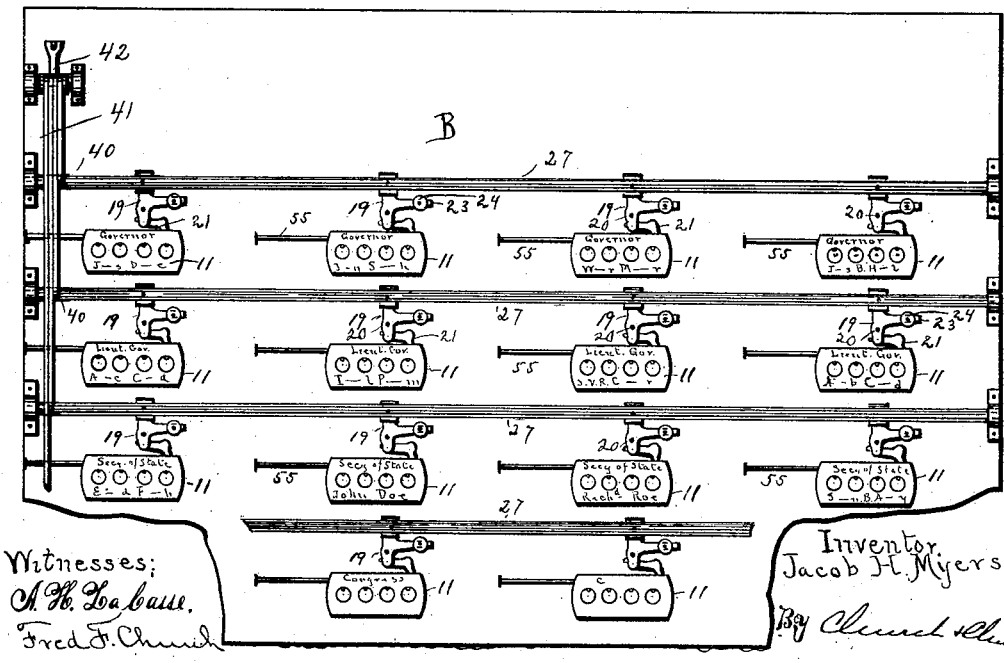
Witnesses:
A. H. LaCasse.
Fred F. Church.
Inventor
Jacob H. Myers
By Church & Church
Attorneys.

(No Model.) 4 Sheets—Sheet 4.
J. H. MYERS.
VOTING MACHINE.
No. 415,549. Patented Nov. 19, 1889.
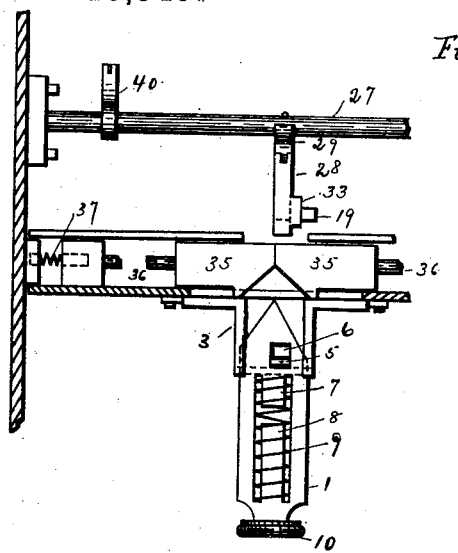
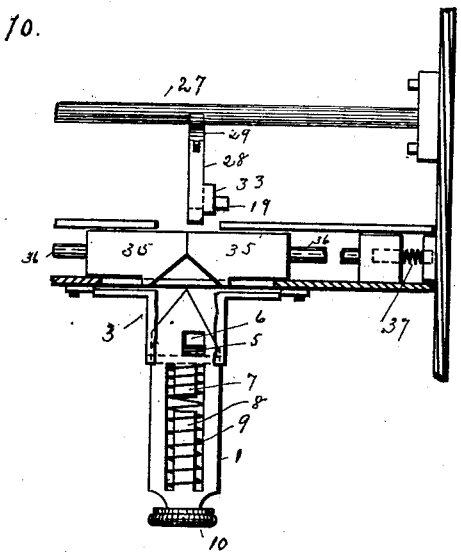
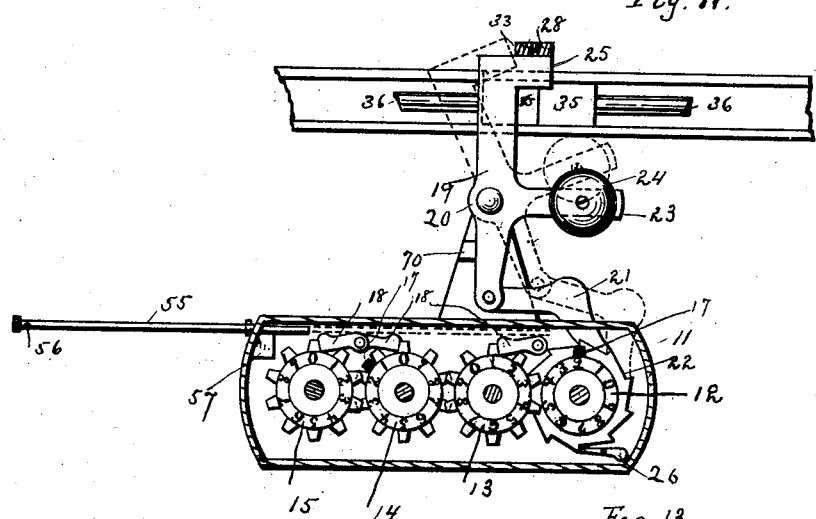
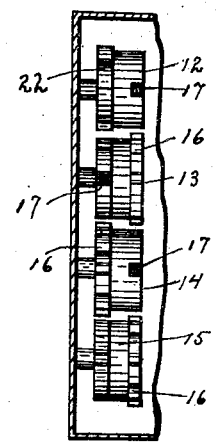
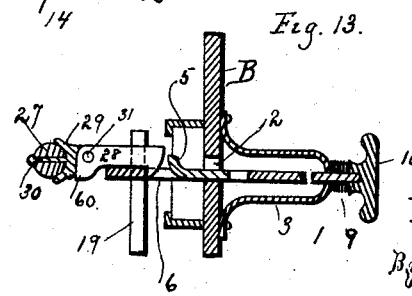
Witnesses.
A. H. Labasse.
Fred F. Church
Inventor.
Jacob H. Myers.
By Church & Church
Attorneys.

UNITED STATES PATENT OFFICE.

JACOB H. MYERS, OF ROCHESTER, NEW YORK.

VOTING-MACHINE.

SPECIFICATION forming part of Letters Patent No. 415,549, dated November 19, 1889.

Application filed May 17, 1889. Serial No. 311,145. (No model.)

*To all whom it may concern:*

Be it known that I, JACOB H. MYERS, of Rochester, county of Monroe, and State of New York, have invented certain new and useful Improvements in Voting-Machines; and I do hereby declare the following to be a full, clear, and exact description of the same, reference being had to the accompanying drawings, forming a part of this specification, and to the figures and letters of reference marked thereon.

My present invention relates to voting or balloting machines, and has for its objects to provide one by the employment of which an honest vote can be had and counted without liability of voters being intimidated, the balloting being secret, or of their voting more than once for the same candidate or different candidates for the same office, and as the votes are counted as fast as the voter indicates his preference the total number cast for each candidate can be ascertained rapidly and accurately at the close of the polls.

With these objects in view the invention consists in certain novel constructions and combinations of parts, all as will be hereinafter fully described, and the novel features pointed out particularly in the claims at the end of this specification.

A portion of the devices used in carrying out my present invention are the same as those described in my application, Serial No. 309,112, filed April 29, 1889, and the machine embodies, generally, a booth or chamber containing the operating parts, which the voter enters to indicate his choice of candidates or cast his ballots, and for the purpose of preventing his voting for more than one candidate for the same office or voting more than once for the same candidate I so arrange the parts that a vote indicated for a candidate will prevent a second one being indicated for a candidate for the same office, and will also prevent another vote for the same candidate until another part is operated, in the present instance automatically, when the voter leaves the proximity of the voting place, when all the devices will be returned to normal or first position.

As I prefer to employ a booth or completely inclosed chamber, I will describe this form of apparatus, though it is evident that where doors are employed turnstiles or equivalent devices could be used, or a hand-lever, if desired.

Figure 2:
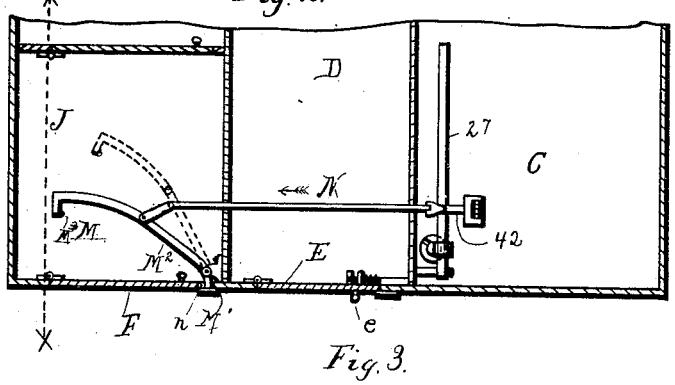
Figure 3:
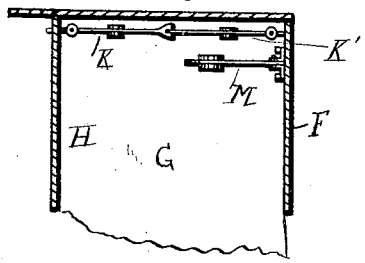

In the accompanying drawings, Figure 1 represents a horizontal sectional view of a voting booth or room constructed in accordance with my invention. Fig. 2 is a similar view taken just below Fig. 1; Fig. 3, a sectional view of the booth, taken on the line $x\ x$ of Fig. 2; Fig. 4, a view of the front of the partition; Fig. 5, a section on the line $a\ b$ of Fig. 4; Fig. 6, a view of a portion of an actuating-bar; Fig. 7, a section on the line $b\ c$ of Fig. 4; Fig. 8, a view of the rear of the partition; Fig. 9, a vertical section of one of the ballot push-keys in normal position; Fig. 10, a horizontal sectional view through the partition, showing two ballot push-keys and connected parts in plan; Fig. 11, a rear view of one of the counters with the casing-cover removed; Fig. 12, a plan view of the counter-gears in Fig. 11; Fig. 13, a sectional view of one of the ballot push-keys and retaining devices in retracted position.

Similar letters of reference in the several figures denote the same parts.

Referring particularly to Figs. 1 to 4, the letter A represents a booth or chamber containing the operating parts, preferably constructed of sheet metal of suitable thickness— say one-fourth of an inch—and formed in sections adapted to be bolted together, capable of being readily taken apart and stored or set up in the room or at the place where the election is to be held. Extending lengthwise of this chamber is a partition or wall B, dividing the booth into compartments or chambers, the one C containing the counting and operating mechanism and accessible only to the judges and inspectors of election, and the other D, to which the voter has access to indicate his choice of candidates. The front of the booth is provided with doors E and F, the former constituting the entrance-door and provided with a spring-latch having an operating-handle $e$ on the outside, and the latter having a spring-lock thereon, with its operating-handle $f$ on the inside of the booth or room and serving as an exit-door, the construction of both being such that a voter must enter through door E and emerge through door F. Inside the compartment D is a partition G, forming, with an interior door H, a compartment or vestibule J inside of the door F, said door H being provided with a spring-lock and operating-knob $j$ on the side toward D, so that when one passes into the vestibule and closes the door he cannot pass back again, being unable to open the door from this side; but he may pass out through door F, which opens toward him, not, however, until he closes door H, which unlocks door F. In the upper portion of the vestibule or chamber J are pivoted two levers K K', connected at their inner proximate ends by a slot-and-pin connection, as shown, the one K with its outer end arranged to project in the path described by the door F and prevent its being opened and the other K' adapted to be struck and operated by the door H when closed to move the end of lever K out of the path of door F.

L represents a spring operating to press the outer ends of the levers into the paths of the doors, locking F, if the door H is open, as in Fig. 1; but when the latter is closed the spring is compressed and the door F released.

As stated, the ballot-counting devices are situated in compartment C, and in the partition B are provided a series of indicating devices, by means of which the voter, indicating his choice of candidates, counts one vote for each of them; but these indicating devices must be so locked after a vote is indicated and counted as to prevent a vote being indicated for more than one candidate for the same office, and must be released only after the voter leaves their proximity, thereby preventing the possibility of a second vote being indicated.

The releasing devices, which will be presently described, operated by a series of rock-shafts, are moved by the exit-door in the following manner: At the upper part of the vestibule is pivoted a bent lever M, having its shorter end M' projecting between the edge of door F and the door-casing and its longer arm formed with a substantially straight portion $M^2$ and beyond this with a portion curved in an arc substantially the same as that described by the edge of door F, while its extreme end is provided with a small hook or stop $M^3$. On the door is arranged a small roller or projection $n$, co-operating with the lever M when the door is opened, while the lever, through a rod N, pivoted on its rear side, operates the releasing devices of the indicators.

The operation of the described devices will now be understood. The voter, entering the booth through the door E, closes the latter and indicates his choice of the candidates by operating the ballot push-keys, farther on described, the movement of each one counting a vote for the candidate it represents, and becoming locked prevents its second operation, or the operation of another in the same line. Then, by means of handle $j$, he opens door H, his only means of exit, and passes into vestibule J. The opening of door H permits spring L to project lever K in the path of door F, preventing its being opened until the voter passes into the vestibule and closes door H behind him. This will release door F, and the lock on door H catching, as it must do in order to fully operate the unlocking devices K K', he can only emerge through door F, which he does. When door F is opened, its edge or the roller therein moves along the lever M and turns it back on its pivot, causing the movement of the link N in the direction of the arrow, Fig. 2, operating the push-releasing devices until the curved portion of the lever is reached, when the lever will cease to move, being curved on the arc traversed by the door edge. The door is then moved in a direction to close it until its edge reaches the portion $M^2$, when the weight or spring employed to return the ballot push-catches to normal position, operating through the lever, will push it closed, and the lock catching, it will be prevented from being opened from the exterior of the booth, the door engaging the end of the lever and preventing the operation of the push-releasing devices except by the opening of the door again.

The partition or wall B is divided off into suitable vertical divisions or spaces, as in Fig. 4, one division being devoted to the candidates of a particular party or denomination, and as many divisions may be made as desired, though I have shown only four, devoted to the "Democratic," "Republican," "Prohibition," and "Labor" parties, each being designated by a sign placed at the top, and, if desired, by coloring the signs in each division differently. In each of the divisions are placed signs bearing the names of the particular candidates and the particular offices for which they are nominated, as, if the machine is to be employed for a state election, the first of the signs in all the divisions may contain the words "For Governor," giving the candidate's name, the second "Lieutenant Governor" and the candidate's name, the third "Secretary of State," and so on down through the list of nominees. A number of ballot push-keys 1 are provided in each of the party-divisions, operating through slots 2 in the partition—one opposite each of the candidates' names—for the indication of votes, and the keys of all the candidates for the same office should be in substantially the same plane, as in Fig. 4. At the front of each of the apertures 2 in the partition are provided casings 3, preferably of sheet metal, in which the push-keys 1 operate. These casings are provided with apertures corresponding to and in line with those in the partition, and each of the keys is also preferably stamped from sheet metal and formed with the inner ends pointed, as in Fig. 10, a tongue 5 turned up, leaving an aperture 6, which tongue also forms a stop for co-operating with the casing and limiting the outward movement of the key. Suitable tongues 7 and 8 are also formed in slots in the keys for holding in position the springs 9 encircling them, and arranged between the outer end of the casing and knobs 10 on the ends of the keys, as shown, said springs operating to force the keys outward to the position shown in Figs. 9 and 10 when the keys are released. Just back of each of the push-keys, and in chamber C, are arranged counters 11, consisting, preferably, of a series of wheels 12, 13, 14, and 15, each having on its outer face a series of numbers from 1 to 10, adapted to be exposed in succession in front of suitable apertures in the casing as the wheels are revolved. Of course any suitable method of gearing the wheels together could be employed; but I prefer to arrange them, as in Figs. 11 and 12, with a series of teeth 16, adapted to be operated upon by the single or transferring tooth 17 on each wheel in a different plane from the actuated teeth 16. Suitable gravitating pawls 18 are pivoted in the counter-casing, co-operating with the teeth 16 and preventing backward rotation of the counter-wheels.

The counters are preferably secured to the partition B, and each is provided with a registering-lever 19, pivoted at 20 and having pivoted to its lower end a weighted pawl 21, arranged to rest in contact with ratchet-teeth 22 on wheel 12, as shown, passing through a suitable slot in the upper side of the casing. This lever is provided with a laterally-extended arm 23, on which is an adjustable weight 24 for returning it to normal position against stop 70 after being operated, and its upper end is provided with a short lateral wing or extension 25, as in Fig. 11, upon which the key-retaining dog is adapted to rest.

When the counter-levers 19 are in normal position, they are slightly to one side of the pointed end of the push-keys, so that when the latter are pushed in the inclined side striking the lever will turn it on its pivot to the position indicated by dotted lines in Fig. 11, causing the first wheel of the register to be turned the distance of one tooth, counting one vote for the candidate the counter represents, the backward rotation of the first wheel being prevented by a weighted pawl or dog 26, co-operating with said ratchet-teeth, as shown, when the lever returns to normal position. As will be seen, a complete revolution of wheel 12 will cause its tooth 17 to rotate wheel 13 a distance of one tooth, indicating another figure at its exposing-aperture in the counter-face, and a complete revolution of 14 will cause the movement of wheel 15 one tooth, bringing another figure in exposed position, and so on.

Sufficient space is left between the top of the counter-casing and the gravitating pawls 18 for the passage of a counter-locking bar 55, arranged to be passed in a perforation in the end of the casing, and when in position to hold the pawls down against the teeth of the wheels, preventing any movement of the latter, and in order to lock this bar in position, so that it can only be removed and the counters rendered operative by the proper person, I provide it with a notch 56, in which the bolt of a lock 57 enters, said lock being accessible from the end of the casing, as shown. This device will prevent all unwarranted interference with the counters, as it is designed to push the bars in and lock the counters as soon as the polls are closed. For the purpose of preventing the immediate return of the push-keys to normal or outward position after the actuation of the counters, thus giving a voter no opportunity to indicate and count two or more ballots for the same candidate, I locate back of each of the horizontal lines of push-keys a rock-shaft 27, journaled in suitable bearings and provided with a number of key-retaining dogs 28, one for each key, adapted to engage with and retain the keys in position when pushed in, holding the counter-levers in the position shown in dotted lines, Fig. 11, which will lock the counters. These key-retaining dogs are preferably constructed as in Figs. 9, 10, and 13, provided with a hook at the forward end, a small wing 33 at one side, and a shoulder 60 at the rear lower side, being pivoted to castings or supports 29, preferably constructed of cast metal, partially encircling the shafts 27, and provided with pins or extensions 30, passed through perforations in said shafts and headed up on the rear sides, as shown, thus making a firm and substantial connection. The shoulders 60 will engage with the lower sides of the castings when in lowermost position, and when said shafts are rotated backward the dogs will be lifted, though they are permitted an upward movement on the supports 29, turning on the pivotal pins 31.

The normal position of the counter-levers is as in full lines in Fig. 11, with the retaining-dogs 28 on top of the extensions 25, and when one of the keys is pushed back the lever is gradually moved to one side until the end of the ballot push-key is directly beneath the dog end, the latter being supported until this time by the wings on the lever and dog, then the dog drops toward and finally into the aperture 6 and retains the key in retracted position, (see Fig. 13,) preventing second operation and locking the counter, as in dotted lines, Fig. 11. The construction is such that in order to actuate the counter fully and turn the first wheel one tooth the key must be moved in so far that the retaining-dog will engage it and prevent its second operation without failure.

Upon the rotation of the shafts backward (which is caused by the departure of the voter from the proximity of the front of partition B) the shoulders 60 on the dogs will cause the latter to be lifted out of the keys, when their springs will return them to normal outward position, the weights on the counter-levers also returning to normal position as soon as the keys are out of the way, and as the dogs are lifted above the lever ends the latter will pass beneath and support them, as before.

As stated, in the present construction I prefer to arrange all the push-keys for the candidates for the same office in the same plane, and as a means for preventing a vote for more than one candidate being indicated by a voter I employ substantially the same locking or interlocking device as shown in my former application referred to. In the rear of each line of push-keys are arranged a series of reciprocating locking plates or blocks 35, two being provided for each push-key and the proximate blocks of adjacent keys being connected by rods or connecting-stops 36, as shown. The engaging-faces of the blocks are preferably beveled, and those at opposite ends of each series pressed toward the center by springs 37 37, adapted to keep the blocks together, except when a key is pushed in, when they will be compressed. The total amount of movement allowed the series is less than twice the width of a single key, so that when one key is pushed in there will not be room for a second one in that series, and any attempt to operate a second push-key before the first has been released would be prevented. Each of the shafts 27 is provided near one end with an arm or crank 40, connected by a link or connecting-rod 41 with a yoke formed on one arm of a bell-crank lever 42, pivoted to partition B and connected by connecting-rod N with lever M, operated by door F, so that when the lever M is moved back the bell-crank will be operated and all the shafts, through connecting-rods 41, oscillated backward, lifting the key-retaining dogs and permitting all the keys to resume normal projected position. For the purpose of returning these shafts to normal position and holding them there, and also assisting to close the door F, if desired, the lower or any of the series of shafts 27 is provided with a short arm 43, upon which is hung a weight 44, adapted to be raised when the door is opened and the operation just described accomplished, and then operating to turn the shafts back and close the door, this movement also returning the shafts to normal position with the retaining-dogs on top of the counter-levers.

It is usually the case that voters wish to cast their ballots for all the nominees of a particular party, or "vote a straight ticket," as it is called, and in order to enable this to be done without the necessity of operating the individual ballot-indicating keys one at a time I provide bars 45, hinged on the division-lines between the party-divisions and arranged, when swung on the pivots 46 by means of handles 47, to come in contact with a line of ballot-pushes and operate them all simultaneously, and by the arrangement shown each bar can be used for two parties' candidates, being capable of being swung over toward either. Sometimes, however, a voter desires to vote for one or more candidates in another party, which of course would lock the remaining keys designating candidates for that office, and if no provision were made for this a single locked projected push would prevent the complete pushing in of the keys, as the bar 45 would be prevented from complete inward movement; but this I prodide for by making the portions on the bar coming in contact with the push-keys so as to yield when any key is locked, thus permitting the movement of the bar necessary to properly operate the keys.

In the present construction the bar 45 is composed of two side plates 48, each provided with apertures 49 therein arranged to come over the push-keys when turned, and on both sides of the apertures are small rods 50, connecting and bracing the plates, forming guideways for plates 51, arranged in the insides of the plates 48 and held pressed toward them by springs 52, encircling said rods, as shown. These plates preferably have slight depressions in them for the knobs of the keys, and the springs 52 are stronger than those on the push-keys, so that when the bar 45 is operated the springs will overcome the push-key spring and operate the key inward.

The operation of this device will now be understood, as if the bar 45 is moved to operate a series of keys and any one is locked and prevented from operation the springs 52 will give and allow the knob to press the plate back against springs 52, but said springs will be strong enough to operate the pushes not so held.

Voters, both those unable to read and others, may be instructed in the use of the apparatus by a fac-simile of the front of the partition B, giving the location of the various push-keys for the candidates, so that when he enters the booth to vote he will know how to proceed.

The booth, if a separate structure, can be set up in the room where the election is to be held, or any chamber can be divided off into compartments, substantially as shown; but in any event the judges and inspectors of elections are in front of the entrance to the booth and pass upon the qualifications of the voter, and if he is found qualified he enters the booth and closes the door behind him. Once inside, if he wishes to vote a straight ticket, he operates one of the bars 45 toward the division of the party he wishes to vote for, which will cause all the push-keys in the division to move inward, indicating and counting one vote for each candidate, and the key-retaining dogs, dropping down and holding the keys inward, will prevent the operation of any more keys. If the voter should desire to vote for different candidates, he operates the push-keys devoted to them, or if he desires to vote for all the candidates for one party excepting one or two, and these in a different one, he first operates the push-keys devoted to the single candidates, which will of course lock all the remaining keys in the line devoted to candidates for those offices, and he then moves one of the bars 45 over toward the line he desires to vote for, which will cause the push-keys in lines not locked to move in and register votes, but the springs 52 on the bar in the lines previously voted in will yield and leave those push-keys projected. After the voter has finished voting he passes through doors H and F, as before described, the operation of opening door F oscillating the shafts 27, releasing the push-keys and allowing the parts to return to normal position, ready for the next voter.

At the close of the election the ballot-counter lock-bars are pushed in, thus locking the counters and preventing any interference with them, when the number of ballots cast for each candidate can be immediately ascertained and recorded by an inspection of the counters.

I do not wish to be understood as confining myself to the construction of the inclosed booth herein shown, as the same objects could be accomplished by employing turnstiles instead of doors; but I prefer the described devices, because they enable a secret ballot to be had. Other key-releasing devices operated by the voter could be employed in lieu of the connection with the door shown, the object being to prevent the possibility of more than a single vote being cast for more than one candidate for the same office.

Instead of employing the separate connecting-rods 41—one for each shaft 27—I prefer in some instances to employ but a single rod connected to all of the crank-arms 40 and the bell-crank lever 42, this construction causing the simultaneous operation of all the shafts, as before.

I do not claim herein any devices covered by my application hereinbefore referred to.

I claim as my invention—

1. In a voting-machine, the combination, with a series of vote-indicators and a series of keys for actuating them, of a shaft and a series of retaining-dogs with which the keys engage, pivoted on the shaft, and independently movable in one direction, substantially as described.

2. In a voting-machine, the combination, with a series of counters and a series of keys for actuating them, of a shaft and a series of key-retaining dogs pivoted thereon, independently movable in one direction, and means, substantially as described, for oscillating the shaft, as set forth.

3. The combination, with a counter and its operating-arm, of a key for actuating said arm, a retaining-dog for holding the key after it has been operated, normally held out of operation by the counter-arm, but permitted to engage the key and hold it after the said arm has been moved out of the way, and the counter operated by the key, substantially as described.

4. The combination, with a counter and its lever, of a key having the inclined end co-operating with the lever when actuated, and a pivoted key-retaining dog normally supported on the counter-lever, adapted to engage the key when the lever is moved, substantially as described.

5. The combination, with the counter and its operating-lever, of a key constructed of flat material, having the tongue and recess near one end, the spring for projecting it, and a retaining-dog co-operating with the recess in the key, substantially as described.

6. The combination, with a counter and its operating-lever, of a key constructed of flat material, with the recess for the spring and the two projections therein, the recess at the inner end, the spring, and a retaining-dog for co-operating with the end recess in the key, substantially as described.

7. The combination, with the counter embodying the train of gears and the ratchet-wheel, of the pivoted operating-lever having the weight, the weighted pawl connected thereto, the indicating-key having the inclined end for co-operating with the lever, and its retracting-spring, substantially as described.

8. The combination, with the counter embodying the gear train and a pawl co-operating with one or more of the gears, of a locking-rod arranged to engage the pawl or pawls and prevent the operation of the gear train, substantially as described.

9. The combination, with the counter embodying the gear train and a pawl co-operating with one or more of the gears, of a rod arranged to engage the pawl or pawls and a lock for retaining it in position, whereby the counter can be locked when desired, substantially as described.

10. In a voting-machine, the combination, with the ballot-indicating key, of a counter having the operating portion—such as a lever—with the overhanging end and a key-retaining dog supported on said overhanging portion, adapted to be released to engage the key when the counter is operated by the latter, substantially as described.

11. In a voting-machine, the combination, with the partition or plate having the aperture therein, a series of ballot-indicating keys and their supporting-casings, forming separate structures secured to said plate, a series of counters with which the keys co-operate, and their casings forming separate structures secured to the other side of the plate, of interlocking devices mounted on the casing between the keys and counters for preventing the operation of more than one key at a time.

12. In a voting-machine, the combination, with a series of ballot-indicating keys having the inclines thereon, and a series of counters having movable portions operated upon by the inclines on the keys, of a series of blocks between the keys having the beveled portions co-operating with those on the keys, substantially as described.

13. In a voting-machine, the combination, with the partition or plate having the series of apertures therein, and the ballot-indicating keys operating through them, of the series of blocks arranged to cover said apertures, the flanged plates secured to the partition for holding them in position, and the spring or springs for pressing them together, substantially as described.

14. In a voting-machine, the combination, with a series of separate ballot-indicating keys, of a bar having yielding portions or plates thereon corresponding to the keys, arranged to be moved to operate said series simultaneously, and locking devices for preventing the operation of one or more keys of the series, substantially as described.

15. In a voting-machine, the combination, with two series of separate ballot-indicating keys, of a bar pivoted between said series having yielding portions or plates on opposite sides thereof corresponding to the keys, arranged to be moved to operate one or the other of said series simultaneously, and locking devices between corresponding keys in the two series for preventing the operation of the other when one has been operated, substantially as described.

16. In a voting-machine, the combination, with two or more series of ballot-indicating keys, one for each candidate, and interlocking devices between the keys of the candidates for the same office for preventing the operation of more than one key, of a bar having yielding portions adapted to be moved to operate one of said series of keys, substantially as described.

17. The combination, with two series of keys, of the bar for operating them, consisting of the two plates having the perforations therein corresponding to the keys, the small plates, the guide-rods, and springs pressing the small plates apart, substantially as described.

JACOB H. MYERS.

Witnesses:
WILLIAM KNAPP,
WILLIAM SHAEFER.